(12) United States Patent
Hiratsuka

(10) Patent No.: US 7,563,535 B2
(45) Date of Patent: Jul. 21, 2009

(54) BATTERY PACK WITH INSULATING FILM SHEATH MATERIAL AND METHOD OF PRODUCING THE SAME

(75) Inventor: Masaru Hiratsuka, Kanagawa (JP)

(73) Assignee: Sony Corporation, Tokyo (JP)

( * ) Notice: Subject to any disclaimer, the term of this patent is extended or adjusted under 35 U.S.C. 154(b) by 283 days.

(21) Appl. No.: 10/356,121

(22) Filed: Jan. 31, 2003

(65) Prior Publication Data

US 2003/0165736 A1    Sep. 4, 2003

(30) Foreign Application Priority Data

Feb. 6, 2002    (JP)    .............................. 2002-030165

(51) Int. Cl.
*H01M 2/02* (2006.01)
*H01M 2/04* (2006.01)
*H01M 2/24* (2006.01)
*H01M 6/00* (2006.01)

(52) U.S. Cl. .................. 429/153; 429/176; 429/175; 429/160; 429/125; 29/623.1

(58) Field of Classification Search ................. 429/153, 429/176, 175, 160, 125; 29/623.1
See application file for complete search history.

(56) References Cited

U.S. PATENT DOCUMENTS 4,582,767 A * 4/1986 Morioka et al. ............. 429/121
6,451,474 B1 * 9/2002 Kozu et al. .................. 429/100
6,632,538 B1 * 10/2003 Yamazaki et al. ........... 428/461
2002/0034685 A1 * 3/2002 Sato et al. .................... 429/176
2005/0175891 A1 * 8/2005 Kameyama et al. ......... 429/163

FOREIGN PATENT DOCUMENTS

JP    2001325927 A    * 11/2001

* cited by examiner

*Primary Examiner*—Mark Ruthkosky
*Assistant Examiner*—Karie O'Neill
(74) *Attorney, Agent, or Firm*—Robert J. Depke; Rockey, Depke & Lyons, LLC

(57) ABSTRACT

Disclosed are a battery pack and a method of producing the same. A battery pack includes a cell main body in which a cell element comprising a solid state electrolyte or a gel form electrolyte disposed between a cathode active material layer and an anode active material layer is contained inside a sheath material comprised of an aluminum laminated film, an outer case having a box-like shape with one end face open and containing the cell main body therein, and a cap for closing the open face of the outer case. In the battery pack, initial charging of the cell main body is conducted after the cell main body is contained into the outer case to assemble the battery pack. An enhancement of cell capacity at a fixed outside size or a reduction in outside size at a fixed cell capacity is achieved.

13 Claims, 4 Drawing Sheets

BATTERY PACK WITH INSULATING FILM SHEATH MATERIAL AND METHOD OF PRODUCING THE SAME

BACKGROUND OF THE INVENTION

The present invention relates to a battery pack and a method of producing the same, and more particularly to a battery pack in which a polymer battery comprising a sheath material consisting of a laminated film is contained in an outer case, and a method of producing the same.

In recent years, portable electronic apparatuses such as camera-integrated type VTR (videotape recorder), cellular phones, notebook type personal computers, etc. have appeared, and reductions in the size and weight thereof have been contrived. Attendant on this, as to a driving power source for such a portable electronic apparatus, an increase in capacity and a further reduction in size have come to be keenly demanded. As this type of driving power source, the so-called polymer battery comprising a polymer cell contained inside a laminated film has been put to practical use. It is being investigated to contain such a polymer battery further into an outer case, in view of the need to protect the polymer battery from external shocks, scratching or the like.

Hitherto, as an outer case for containing the cell main body therein, an outer case with the split-in-two structure consisting of a combination of an upper-lower pair of case halves formed of a synthetic resin which are produced by molding (hereinafter referred to simply as the resin-made outer case) has been in general use. More specifically, it has been practiced to dispose the cell main body in one of the case halves, put the other of the case halves thereon, and join the peripheral contact surfaces of the case halves to each other by ultrasonic welding or the like, thereby obtaining a battery pack.

In the above-mentioned resin-made outer case, a material thickness of about 0.3 to 0.4 mm is needed, for protecting the cell main body disposed therein from external shocks and the like. In addition, in the resin-made outer case, it is necessary to fix the cell element to one of the case halves by an adhesive or a double-coated tape, for preventing the cell main body from chattering inside the case, for reinforcement in case of falling, or for other purposes. Furthermore, taking into account the tolerance at the time of molding the case halves, in the case of the resin-made outer case, the overall thickness of the battery pack is determined by adding the thickness of portions not contributing to the cell capacity of about 1 mm to the thickness of the cell main body which is the power generation element.

Besides, in the resin-made outer case, in the case of joining the upper-lower pair of case halves to each other by ultrasonic welding, a material thickness of 0.7 to 1 mm is required at the joint portions in order to obtain sufficient strength for enduring the welding.

Thus, in the case of using the resin-made outer case, the portion which is necessary on a structural basis but which does not contribute to cell capacity is bulky, so that it has been difficult to achieve a further reduction in size and a further increase in capacity.

SUMMARY OF THE INVENTION

Accordingly, it is an object of the present invention to provide a battery pack with which it is possible to achieve a higher capacity and a smaller size, more specifically, an enhancement of the cell capacity at a fixed outside size or a reduction in outside size at a fixed cell capacity, and a method of producing the same.

In order to attain the above object, according to a first aspect of the present invention, there is provided a battery pack comprising a cell main body in which a cell element using a solid state electrolyte or a gel form electrolyte as an electrolyte is contained inside an insulating film form sheath material, a box-shaped outer case with one end face open, and a cap to be fitted to the open face, wherein the cell main body is contained in the outer case, and the open face of the outer case is closed with the cap.

The battery pack according to the present invention constituted as above has a structure in which the case itself is thinner than the conventional outer case made of resin and having the split-in-two structure. Therefore, where the outside size of the outer case is fixed, the inside volume is enlarged. As a result, it is possible to enlarge the size of the cell main body to be contained in the inside of the outer case, whereby an increase in cell capacity is realized. On the other hand, where the cell capacity is fixed, the battery pack can be made smaller in size.

In addition, according to a second aspect of the present invention, there is provided a method of producing a battery pack, wherein a cell main body in which a cell element using a solid state electrolyte or a gel form electrolyte as an electrolyte is contained inside an insulating film form sheath material is contained into a box-shaped outer case with one end face open in the condition where initial charging of the cell main body is not yet conducted, and thereafter the initial charging is conducted.

When initial charging of the cell main body is conducted after the battery pack is assembled, the cell main body is expanded, to make close contact with inside wall surfaces of the outer case. Therefore, it is possible to design so that the clearance between the outer case and the cell main body is reduced to zero upon the initial charging. With such a designing, it is possible to secure a high cell capacity through effective utilization of the inside volume of the outer case. Besides, by the above-mentioned close contact of the cell main body with the inside wall surfaces of the outer case, the cell main body is fixed inside the outer case. Therefore, it is needless to use an adhesive or a double-coated tap for the fixation of the cell main body. From this point, too, the cell capacity can be increased.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 2A and 2B are sectional views of the battery pack, in which FIG. 2A is a horizontal sectional view, and FIG. 2B is a vertical sectional view;

DETAILED DESCRIPTION OF THE PREFERRED EMBODIMENTS

Figure 1:
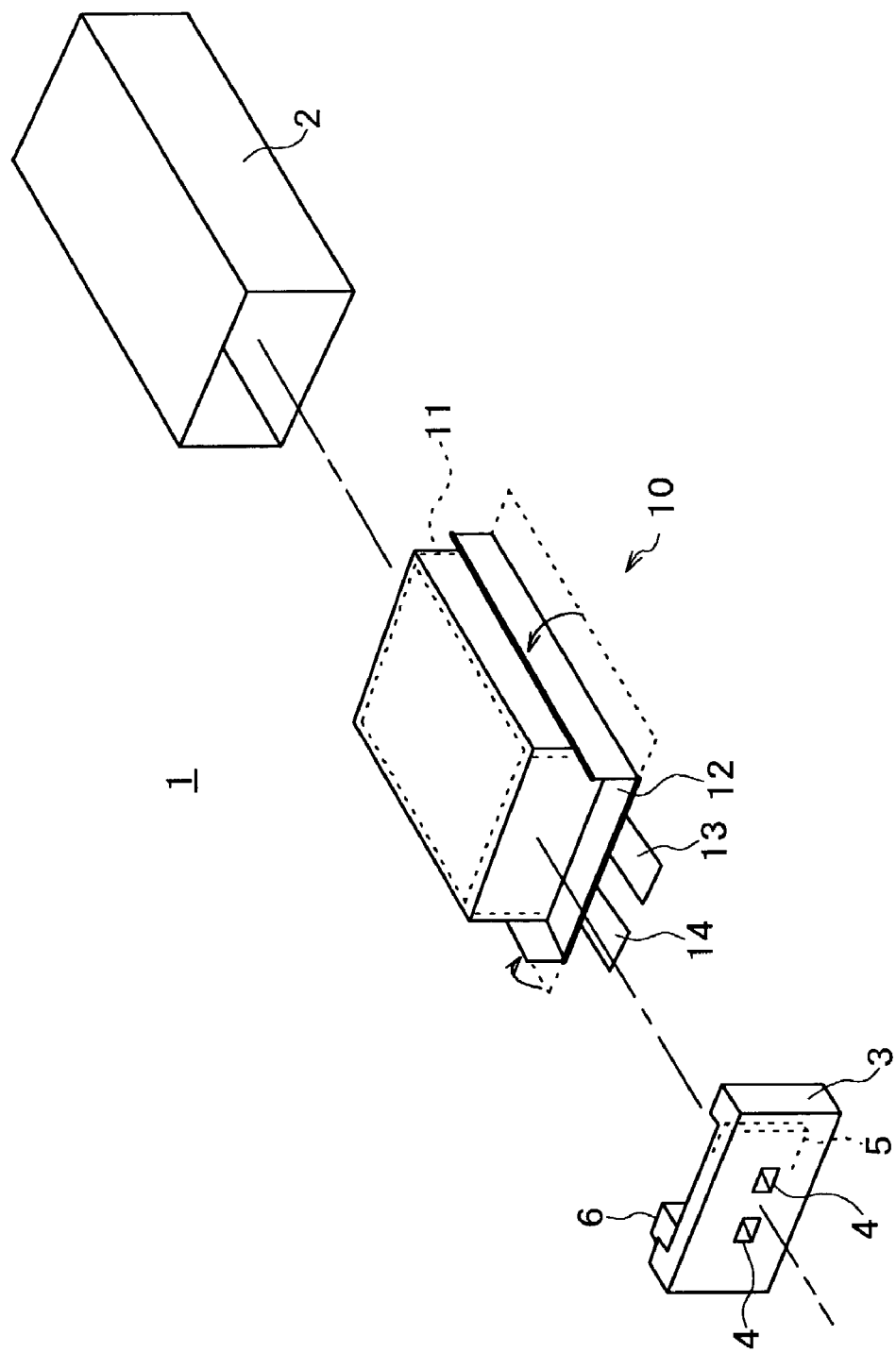
FIG. 1 is an exploded perspective view of a battery pack according to the present invention.

Now, specific embodiments of the battery pack and the method of producing the same according to the present invention will be described in detail below referring to the drawings.

Figure 2A:
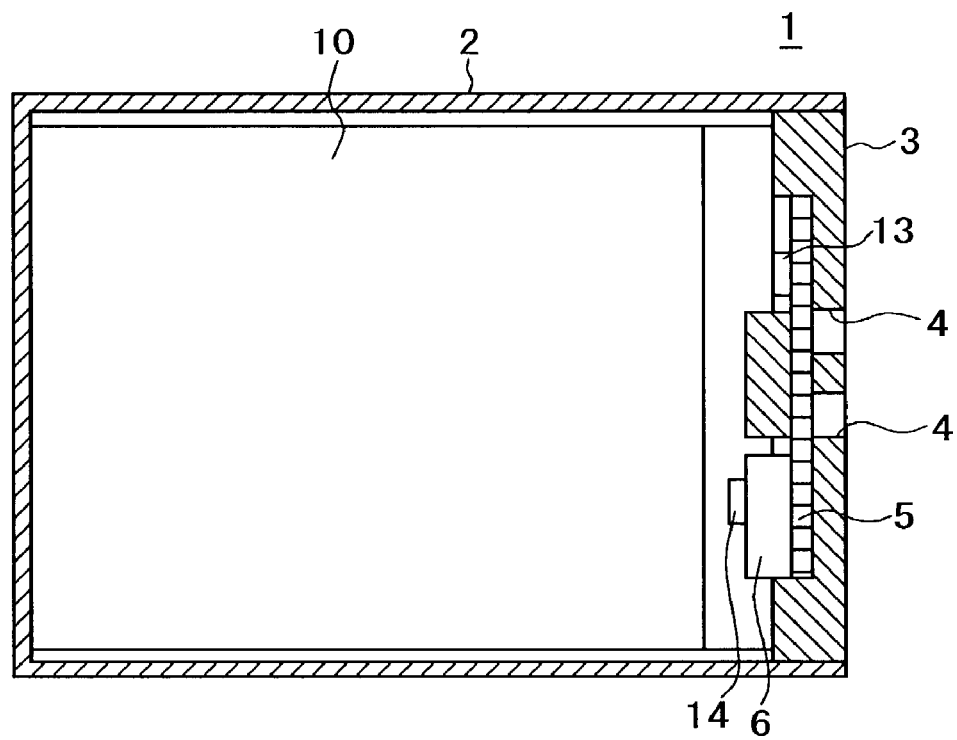
Figure 2B:
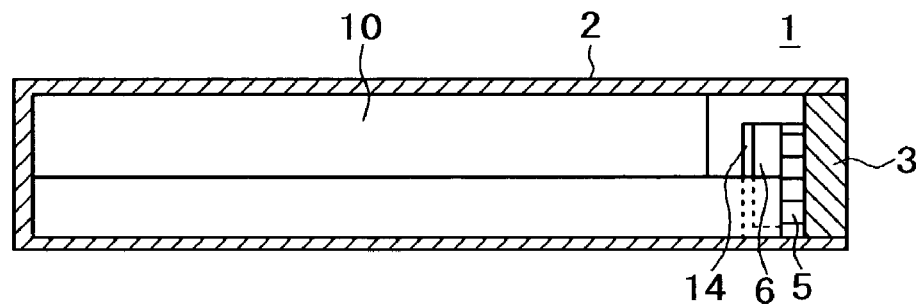

As shown in FIGS. 1, 2A and 2B, the battery pack 1 has a structure in which a cell main body 10 is contained in an outer case 2, and an open face of the outer case 2 is closed with a cap 3.

The cell main body 10 is a solid state electrolyte cell or a gel form electrolyte cell (so-called lithium polymer battery), in which a cell element 11 comprising a solid state electrolyte or a gel form electrolyte disposed between a cathode active material layer and an anode active material layer is contained inside an insulating film form sheath material 12 and is sealed therein by heat-bonding the periphery of the sheath material 12. The sheath material 12 is a plastic film or a laminated sheet comprised of a plastic film and a metal laminated on each other, for example, an aluminum laminated film in which an insulating resin layer, a metallic foil consisting of aluminum and a thermo-fusing resin layer are laminated in this order and adhered to each other. The outside shape of the cell main body 10 is roughly rectangular.

The cell element 11 is provided with an anode terminal lead 13 electrically connected to an anode constituting the cell element 11, and a cathode terminal lead 14 electrically connected to a cathode constituting the cell element 11. The anode terminal lead 13 and the cathode terminal lead 14 are led out to the outside of the sheath material 12.

The anode terminal lead 13 and the cathode terminal lead 14 are joined to anode and cathode current collectors, respectively. As the material of the cathode terminal lead 14, a metallic material which is not dissolved or melted at high potential may be used, for example, aluminum, titanium, or alloys thereof. On the other hand, copper, nickel, or alloys thereof may be used as the material of the anode terminal lead 13.

For example, where a solid state electrolyte cell or a gel form electrolyte cell is assumed, examples of a polymer material usable for a polymer solid state electrolyte in the cell element 11 include silicon gel, acryl gel, acrylonitrile gel, polyphosphazene-modified polymers, polyethylene oxide, polypropylene oxide, and composite polymers, cross-linked polymers and modified polymers of these, etc., or fluorine-containing polymers such as poly(vinylidene fluoride), poly(vinylidene fluoride-co-hexafluoropropylene), poly(vinylidene fluoride-co-tetrafluoroethylene), poly(vinylidene fluoride-co-trifluoroethylene), and the like, and mixtures of these, which are not limitative.

The solid state electrolyte or the gel form electrolyte laminated on the cathode active material layer or the anode active material layer is prepared by impregnating the cathode active material layer or the anode active material layer with a solution comprised of a polymeric compound, an electrolyte salt, and a solvent (and further, a plasticizer, in the case of the gel form electrolyte) and removing the solvent for solidification. The solid state electrolyte or the gel form electrolyte laminated on the cathode active material layer or the anode active material layer is solidified after impregnation of the cathode active material layer or the anode active material layer with a portion thereof. In the case of a cross-linked polymer system, cross-linking under light or heat is thereafter carried out for solidification.

The gel form electrolyte is comprised of a plasticizer containing a lithium salt, and from 2 to 30% by weight of a matrix polymer. In this case, esters, ethers, carbonic acid esters and the like can be used singly or as a component of the plasticizer.

As the matrix polymer for gelling such a carbonic acid ester in conditioning the gel form electrolyte, various polymers ordinarily used for constituting gel form electrolytes can be utilized. From the viewpoint of redox stability, however, it is desirable to use a fluorine-containing polymer such as, for example, poly(vinylidene fluoride) and poly(vinylidene fluoride-co-hexafluoropropylene).

The polymer solid state electrolyte is comprised of a lithium salt and a polymeric compound for dissolving the lithium salt. Examples of polymers usable, either singly or in combination, as the polymeric compound include ether polymers such as poly(ethylene oxide) and cross-linked polymers thereof, poly(methacrylate) ester polymers, acrylate polymers, fluorine-containing polymers such as poly(vinylidene fluoride) and poly(vinylidene fluoride-co-hexafluoropropylene), etc. From the viewpoint of redox stability, however, it is desirable to use a fluorine-containing polymer such as, for example, poly(vinylidene fluoride) and poly(vinylidene fluoride-co-hexafluoropropylene).

As the lithium salt to be contained in the gel form electrolyte or the polymer solid state electrolyte, those lithium salts which are used in ordinary cell electrolytic solutions can be used. As the lithium compound (salt), for example, the following compounds may be mentioned, which are not limitative.

Namely, the non-limitative examples of the lithium compound (salt) include lithium chloride, lithium bromide, lithium iodide, lithium chlorate, lithium perchlorate, lithium bromate, lithium iodate, lithium nitrate, lithium tetrafluoroborate, lithium hexafluorophosphate, lithium acetate, lithium bis(trifluoromethanesulfonyl) imide, $LiAsF_6$, $LiCF_3SO_3$, $LiC(SO_2CF_3)_3$, $LiAlCl_4$, $LiSiF_6$, etc.

These lithium compounds may be used either singly or in combination, among which $LiPF_6$ and $LiBF_4$ are desirable from the viewpoint of oxidation stability.

The concentration of the lithium salt in solution may be 0.1 to 3.0 mol in the plasticizer, in the case of the gel form electrolyte. A preferable concentration range is from 0.5 to 2.0 mol/liter.

The cell main body 10 according to the present embodiment can be constituted in the same manner as a conventional lithium ion cell, except that the gel form electrolyte or solid state electrolyte as described above is used.

Namely, as the anode material in the case of constituting the lithium ion cell, a material capable of being doped and de-doped with lithium can be used. Such an anode material, for example, carbon materials such as difficultly graphitizable carbon materials and graphite materials can be used. More specifically, such carbon materials as pyrolyzed carbons, cokes (pitch cokes, needle cokes, petroleum cokes), graphites, vitreous carbons, organic polymeric compound baked materials (the materials prepared by baking and carbonization of phenol resin, furan resin or the like at an appropriate temperature), carbon fibers, active carbons, etc., can be used. Examples of other materials which can be doped and de-doped with lithium include polymers such as polyacetylene, polypyrrole, etc., and oxides such as $SnO_2$, etc. In forming the anode from such a material, known binders and the like can be added.

The cathode can be constituted by using a metallic oxide, a metallic sulfide, or a specific polymer as the cathode active material, according to the kind of the objective cell. For example, in the case of constituting a lithium ion cell, metallic sulfides or oxides which do not contain lithium, such as $TiS_2$, $MoS_2$, $NbSe_2$, $V_2O_5$, etc., lithium compound oxides consisting primarily of $LiMO_2$ (where M represents at least one transition metal, and x varies according to the charged or discharged state of the cell, and normally ranges from 0.05 to 1.10), and the like can be used as the cathode active material. The transition metal M constituting the lithium compound oxide is preferably Co, Ni, Mn or the like. Specific examples of such a lithium compound oxide include $LiCoO_2$, $LiNiO_2$, $LiNi_yCo_{1-y}O_2$ (where 0<y<1), and $LiMn_2O_4$. These lithium compound oxides constitute cathode active materials which can generate a high voltage and are excellent on an energy density basis. A plurality of ones of these cathode active materials may be used in combination for constituting the cathode. Besides, in forming the cathode by use of such a cathode active material, known conductive agents, binders and the like can be added.

Examples of the structure of the above-described cell element 11 include a stack type in which cathodes and anodes are alternately stacked with the solid state electrolyte sandwiched therebetween, a wound type in which the solid state electrolyte is sandwiched between a cathode and an anode and the sandwich assembly is wound up, and a folded type in which the solid state electrolyte is sandwiched between a cathode and an anode and the sandwich assembly is alternately folded; one of these types can be selected arbitrarily.

The present invention is applicable to both a primary battery and a secondary battery. Particularly, a great effect can be obtained by applying the present invention to a non-aqueous electrolyte secondary battery.

The outer case 2 is for containing the above-described cell main body 10 therein, and is box-like in shape with one end face open, as shown in FIG. 1. It suffices that the outer case 2 has a strength sufficient for protecting the cell main body 10 disposed therein from external shocks and the like. Although the material of the outer case 2 is not specifically limited, it is preferable to use the outer case 2 made of a metallic material such as aluminum (Al) and iron (Fe), from the viewpoints of strength and material thickness for enabling to secure both the strength and a higher capacity and a smaller size which will be described later. In the present embodiment, an aluminum-made outer case 2 was used. The outer case 2 is formed, for example, by deep drawing of an aluminum material. Incidentally, in the battery pack 1, the cell main body 10 is a lithium polymer battery which is free of the fear of liquid leakage, and an aluminum laminated film comprising an insulating resin layer is used as the sheath material 12, so that the cell main body 10 and the outer case 2 are insulated from each other, and the problem of short-circuit or the like would not be generated.

The outer case 2 has a strength sufficient for protecting the cell main body 10 disposed therein from external shocks or the like, as has been described above. In the case of the above-mentioned aluminum-made outer case 2, a material thickness of from 0.15 to 0.2 mm is necessary for realizing the above-mentioned strength. Therefore, the battery pack 1 can realize a sufficient strength with a smaller thickness, as contrasted to the conventional molded resin-made outer case which needs to have a material thickness of at least 0.3 to 0.4 mm and in which the joint portions of the pair of case halves need to have a material thickness of 0.7 to 1.0 mm. As a result, in the battery pack 1, the case itself can be reduced in material thickness. Therefore, where the outside size of the outer case is fixed, the inside volume is enlarged, resulting in that the size of the cell main body 10 to be contained in the outer case can be enlarged and the cell capacity can thereby be increased. On the other hand, where the cell capacity is fixed, a reduction in the size of the battery pack 1 can be achieved.

Figure 3:
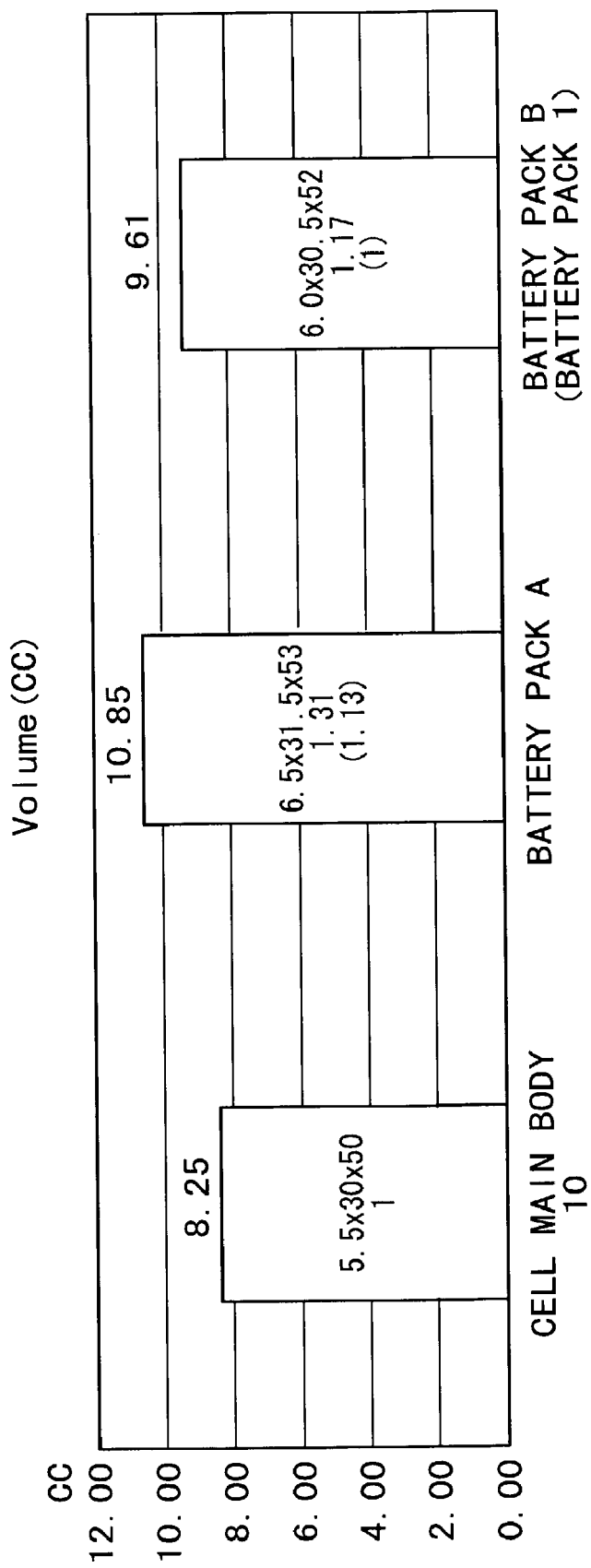
FIG. 3 is a characteristic diagram showing the relationship between volume and cell capacity in battery packs.

For example, the volume required for obtaining a cell capacity equal to that of the cell main body 10 measuring 5.5 mm in thickness, 30 mm in width and 50 mm in length, more specifically, required for containing the cell main body 10 having such a volume, was determined for a battery pack A using the resin-made outer case and for a battery pack B using the aluminum-made outer case 12 (having the same constitution as that of the battery pack 1 according to the present embodiment). The results are shown in FIG. 3. As shown in FIG. 3, a volume of 1.31 times that of the cell main body 10 is required in the case of the battery pack A, whereas a volume of 1.17 times that of the cell main body 10 suffices in the case of the battery pack B. Thus, in the battery pack, the use of the aluminum-made outer case 12 makes it possible to achieve a reduction in size and to enhance the volume efficiency (by about 13% in the above-mentioned specific example), as compared to the case of using the resin-made outer case.

In addition, since the outer case 2 is formed of aluminum less expensive than the resin material which is subjected to molding, the cost of the case itself can be reduced.

Furthermore, since the outer case 2 can be obtained as a single component part by deep drawing of an aluminum sheet as above-mentioned, the number of component parts can be reduced, as compared to the case of the resin-made outer case which has the split-in-two structure composed of a combination of a pair of case halves. Therefore, it is needless to perform positioning of a plurality of component parts or the like, so that it is possible to simplify the designing of the battery pack 1, to enhance the accuracy of the outside dimensions and, further, to enhance reliability and strength. In addition, the use of the outer case 2 which is a single component part as above-mentioned eliminates the need for joining a plurality of component parts by ultrasonic welding as in the case of the resin-made outer case, eliminates the need for an expensive equipment for such joining, and reduces the production cost.

Furthermore, since the outer case 2 is formed of aluminum higher than synthetic resin in hardness, the strength against thumb tacks, knives and the like can also be enhanced.

Incidentally, the cell main body 10 before initial charging is inserted into the outer case 2, as will be detailed later. In the battery pack 1, the cell main body 10 is subjected to initial charging in the state of being contained in the outer case 2.

The cap 3 is destined to be fitted, by pressing-in or the like, to the open face of the outer case 2 containing the cell main body 10, whereby the open face of the outer case 2 is closed. The cap 3 is a molded product made of a synthetic resin such as ABS resin (acrylonitrile butadiene styrene copolymer), polycarbonate, etc. The cap 3 is provided with hole portions 4 for connection between an external circuit and the cell main body 10, and is fitted with a printed board 5 on the side of a surface (hereinafter referred to as the inside surface) directed to the side of the outer case 2 when the cap 3 is fitted to the outer case 2. The printed board 5 is provided, at its surface on the opposite side of the inside surface, with cathode side and anode side external terminals (not shown) fronting on the outside of the outer case 2 through the hole portions 4. The cathode side external terminal is connected to the cathode terminal lead 14 through a thermostat 6 mounted on the printed board 5. On the other hand, the anode side external terminal is connected to the anode terminal lead 13 through a wiring formed on the printed board 5. The thermostat 6 intermediately provided between the cathode side external terminal and the cathode terminal lead 14 is a protective element for protecting the battery pack 1 from abnormal heat generation, rupture or the like by cutting off or restraining an electric current when a large current flows or the cell generates heat abnormally in the battery pack 1. Incidentally, an ID resistor and the like, for example, are mounted on the printed board 5, in addition to the above-mentioned external terminals and the thermostat 6 functioning as the protective element.

The battery pack 1 constituted as described above is produced as follows.

First, the cathode is produced.

A cathode composition containing the cathode active material and a binder is applied uniformly to a metallic foil, for example, an aluminum foil to be a cathode current collector, and is dried to form a cathode active material layer, thereby producing a cathode sheet. Then, the cathode sheet is cut into a belt form, and the cathode terminal lead made of aluminum, for example, is connected to a portion of the cathode current collector not provided with the cathode active material layer, to form a cathode terminal. In this manner, a belt form cathode is obtained. As the binder in the cathode composition, a known binder can be used. Besides, known additives and the like can be added to the cathode composition.

Next, the anode is produced.

An anode composition containing the anode active material and a binder is applied to a metallic foil, for example, a copper foil to be an anode current collector, and is dried to form an anode active material layer, thereby producing an anode sheet. Then, the anode sheet is cut into a belt form, and the anode terminal lead made of nickel, for example, is connected to a portion of the anode current collector not provided with the anode active material layer, to form an anode terminal. In this manner, a belt form anode is obtained. As the binder in the anode composition, a known binder can be used. Besides, known additives and the like can be added to the anode composition.

Subsequently, a gelled electrolyte layer is formed on the cathode active material layer of the cathode. In order to form the gelled electrolyte layer, first, an electrolyte salt is dissolved in a swelling solvent to prepare a plasticizer. Then, the matrix polymer is added to the plasticizer, followed by sufficient stirring to dissolve the matrix polymer, thereby obtaining a sol form electrolyte solution. Then, a predetermined amount of the electrolyte solution is applied to the cathode active material layer. Subsequently, cooling at room temperature is conducted, upon which the matrix polymer gels to form the gelled electrolyte layer on the cathode active material layer.

In addition, a gelled electrolyte layer is formed on the anode, in the same manner as in the formation of the gelled electrolyte layer on the cathode.

Next, an electrode laminate comprising the gelled electrolyte layer sandwiched between the belt form cathode and the belt form anode prepared as above is fixed to a winding core, and is wound around the core a multiplicity of times, and the winding end portion of the electrode laminate is fixed by an element adhesive tape. Further, the winding core is drawn out of the wound electrode laminate, and the wound electrode laminate is pushed down from two directions, to produce the cell element 11 which is roughly oblong in section.

The cell main body 10 is produced by clamping the above-described cell element 11 between sheath materials 12, and adhering peripheral portions of the sheath materials 12 to each other by heat bonding or the like, thereby sealing the cell element 11 inside the sheath material 12. In this case, the anode terminal lead 13 and the cathode terminal lead 14 are led out of the sheath material 12. Then, the heat-bonded peripheral portions of the cell main body 10, more specifically, the peripheral portions adjacent to the side where the electrode terminals are led out are folded in the directions of arrows in FIG. 1.

Subsequently, the thermostat 6 mounted on the printed board 5 provided on the cap 3 and the cathode terminal lead 14 are connected to each other, and the wiring on the printed board 5 in conduction with the anode side external terminal on the printed board 5 and the anode terminal lead 13 are connected to each other. In this case, after connection to the wiring on the printed board 5 and the thermostat 6, the anode terminal lead 13 and the cathode terminal lead 14 are appropriately bent so that the printed board 5 and the thermostat 6 are well contained in the outer case 2. For example, as shown in FIGS. 2A and 2B, when the cap 3 is fitted to the outer case 2, the cathode terminal lead 14 connected to the wiring on the printed board 5 is bent to rise up, while the anode terminal lead 13 connected to the thermostat 6 is once folded back and then bent to rise up.

Figure 4:
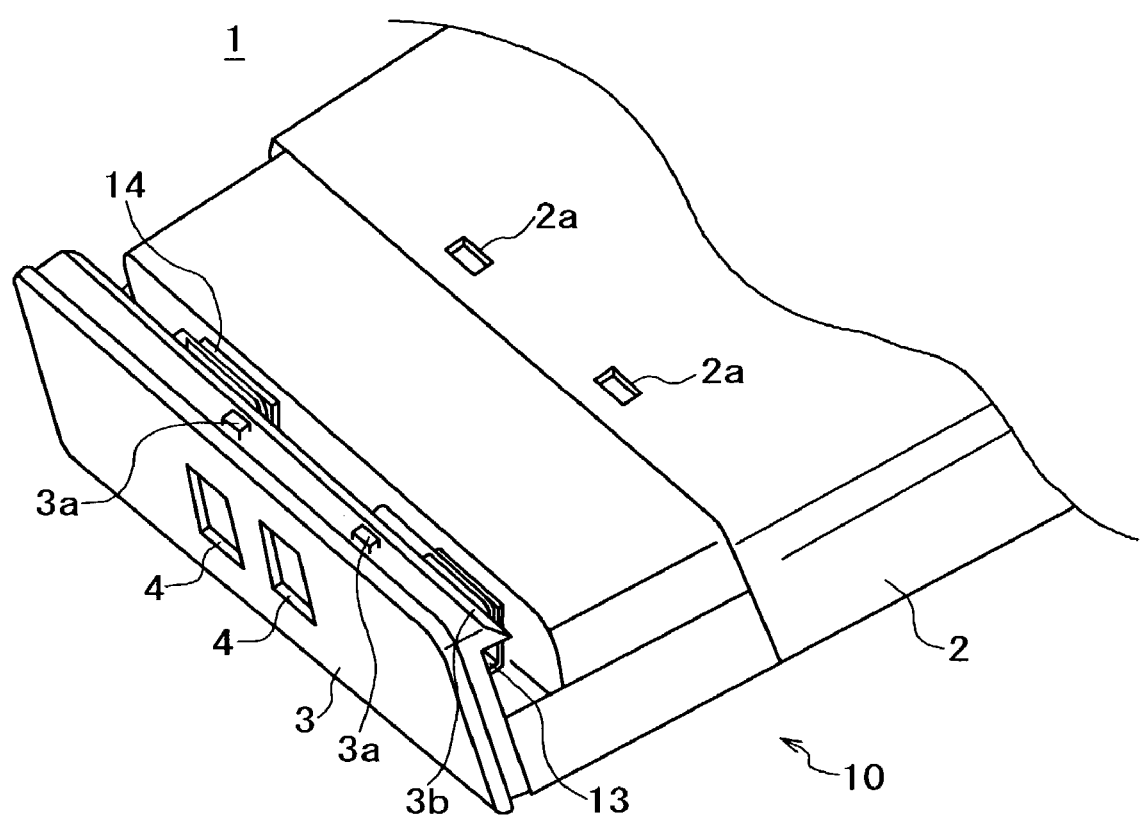
FIG. 4 is a perspective view of a major part showing one example of the fitting structure of a cap to an outer case.

Then, the cell main body 10 produced as described above is contained in the outer case 2 produced by deep drawing of an aluminum sheet, and the cap 3 fitted to the cell main body 10 is subjected to pressing-in or the like so as to close the open face of the outer case 2 with the cap 3. For example, the battery pack 1 has a structure in which, as shown in FIG. 4, fitting projected portions 3a are provided on the side of the cap 3, whereas fitting hole portions 2a are provided on the side of the outer case 2, so that the fitting projected portions 3a are fitted into the fitting hole portions 2a when the cap 3 is pressed into the outer case 2, whereby the cap 3 can be securely fixed to the outer case 2. Incidentally, in such a case, the cap 3 may be provided with a tapered surface 3b at one side edge thereof so as to facilitate the entering of the cap 3 into the outer case 2. By closing the outer case 2 with the cap 3 in this manner, the inside of the outer case 2 of the battery pack 1 can be securely sealed off, whereby penetration of moisture, dust or the like into the outer case 2 can be prevented, and high reliability can be obtained.

After the battery pack 1 is assembled in this manner, initial charging of the cell main body 10 is conducted. Upon the initial charging, the volume of the cell main body 10 is expanded by about 5%. In the battery pack 1, by forming the outer case 2 taking into account such an expansion of the cell main body 10 upon the initial charging, it is possible to achieve such a design as to reduce the clearance between the outer case 2 and the cell main body 10 to zero, and a high cell capacity can be obtained through effective utilization of the inside volume of the outer case 2. In addition, in the battery pack 1, by making possible such a design as to reduce the clearance between the outer case 2 and the cell main body 10 to zero, it is possible to eliminate the need for an adhesive or a double-coated tape for the purposes of prevention of chattering of the cell main body 10 inside the case, reinforcement in case of falling, and the like. Incidentally, although the cell main body 10 shrinks upon discharging, the shrinkage is so slight that there is no fear of chattering of the cell main body 10 inside the outer case 2.

Thereafter, the battery pack 1 is produced through a production process including an aging step and the like similar to that for the ordinary battery pack, and is subjected to tests and selections, before becoming ready for shipment. Since the aging step and the like can be conducted under the condition where the battery pack 1 has been assembled as above-described, the whole process from the production of the cell main body 10 to the production of the battery pack 1 can be carried out continuously, as contrasted to the case of using the resin-made outer case where the aging of the cell main body is followed by assemblage of the battery pack. Therefore, the battery pack 1 makes it possible to enhance production efficiency, to appoint an earlier date of delivery, and to reduce production cost.

While a preferred embodiment of the present invention has been described using specific terms, such description is for illustrative purposes only, and it is to be understood that changes and variations may be made without departing from the spirit or scope of the following claims.

What is claimed is:

1. A battery pack comprising a cell main body in which a cell element using a solid state electrolyte or a gel form electrolyte as an electrolyte is contained inside an insulating film sheath material;
a box-shaped outer metal case with one end face open, and
a cap fitted to said open face of said outer case, wherein the clearance between the outer case, and the cell main body is reduced to substantially zero,
wherein the insulating film sheath material is comprised of an aluminum laminated film in which an insulating resin layer, a metallic foil comprised of aluminum and a thermofusing resin layer are laminated in this order and adhered to each other;
said cell main body is contained in said outer case, and fitting projected portions are provided on a side of the cap, whereas fitting hole portions are provided on the side of the outer case, and said open face of said outer case is closed with said cap, and further wherein the cap fits entirely within the open face of the outer case and the cap has a recess portion provided therein for a circuit portion.

2. A battery pack as set forth in claim 1, wherein said outer case is formed of aluminum.

3. A battery pack as set forth in claim 2, wherein said outer case has a material thickness of from 0.15 to 0.2 mm.

4. A battery pack as set forth in claim 1, wherein said cell main body is brought into close contact with inside wall surfaces of said outer case by volume expansion upon initial charging.

5. A battery pack as set forth in claim 1, wherein said cap is comprised of a molded product.

6. A battery pack as set forth in claim 1, wherein said cap is provided with hole portions for connection between electrodes provided in said cell main body and an external circuit.

7. A battery pack as set forth in claim 1, wherein said wiring board is provided with at least one selected from the group consisting of a resistor and an external terminal.

8. A battery pack as set forth in claim 7, wherein at least one of said anode terminal lead and said cathode terminal lead is electrically connected to said external terminal through said protective element.

9. A battery pack as set forth in claim 1, wherein said protective element is a thermostat.

10. A method of producing a battery pack comprising the steps of:
inserting a cell main body having a cell element using a solid state electrolyte or a gel form electrolyte as an electrolyte inside an insulating film sheath material, providing an outer metal case with one end face open; such that an anode terminal lead and a cathode terminal lead are lead out of the sheath material, wherein the clearance between the outer case, and the cell main body is reduced to substantially zero when charged;
wherein the insulating film sheath material is comprised of an aluminum laminated film in which an insulating resin layer, a metallic foil comprised of aluminum and a thermo-fusing resin layer are laminated in this order and adhered to each other;
bending said anode terminal lead and said cathode terminal lead;
positioning said cell element, said sheath material, and said anode and cathode terminals leads within the outer metal case and further providing a sealing cap that fits entirely within the open end face of the outer case, the cap having a recess portion provided therein with a circuit portion in electrical communication with the anode and cathode terminal leads; and thereafter
initially charging said battery pack.

11. The method of claim 10, prior to said step of mounting said cap, further comprising the step of bending a portion of said one of said anode terminal lead and said cathode terminal lead such that said portion is perpendicular to said wiring board.

12. A battery pack as set forth in claim 1, wherein an anode terminal lead and a cathode terminal lead are formed at a first inside wall surface of the outer case and are bent to
be substantially parallel with a wiring board located between the cap and portions of the anode and cathode; and
a protective element is provided in physical contact with at least a portion of said anode terminal lead or said cathode terminal lead between the wiring board and the anode or the cathode terminal lead.

13. A method of producing a battery pack according to claim 10, further comprising:
mounting a cap at said open end face of said outer case to close said outer case and
positioning a wiring board within said outer case at said open end face and portions of said anode and cathode terminal leads are generally parallel to said wiring board and a protective element is in contact with one of said anode terminal lead and said cathode terminal lead and is located between at least one of the anode terminal and the cathode terminal and the wiring board.

* * * * *